(No Model.) 2 Sheets—Sheet 1.
R. CHESTER.
WATER COOLER AND FILTER.
No. 354,687. Patented Dec. 21, 1886.
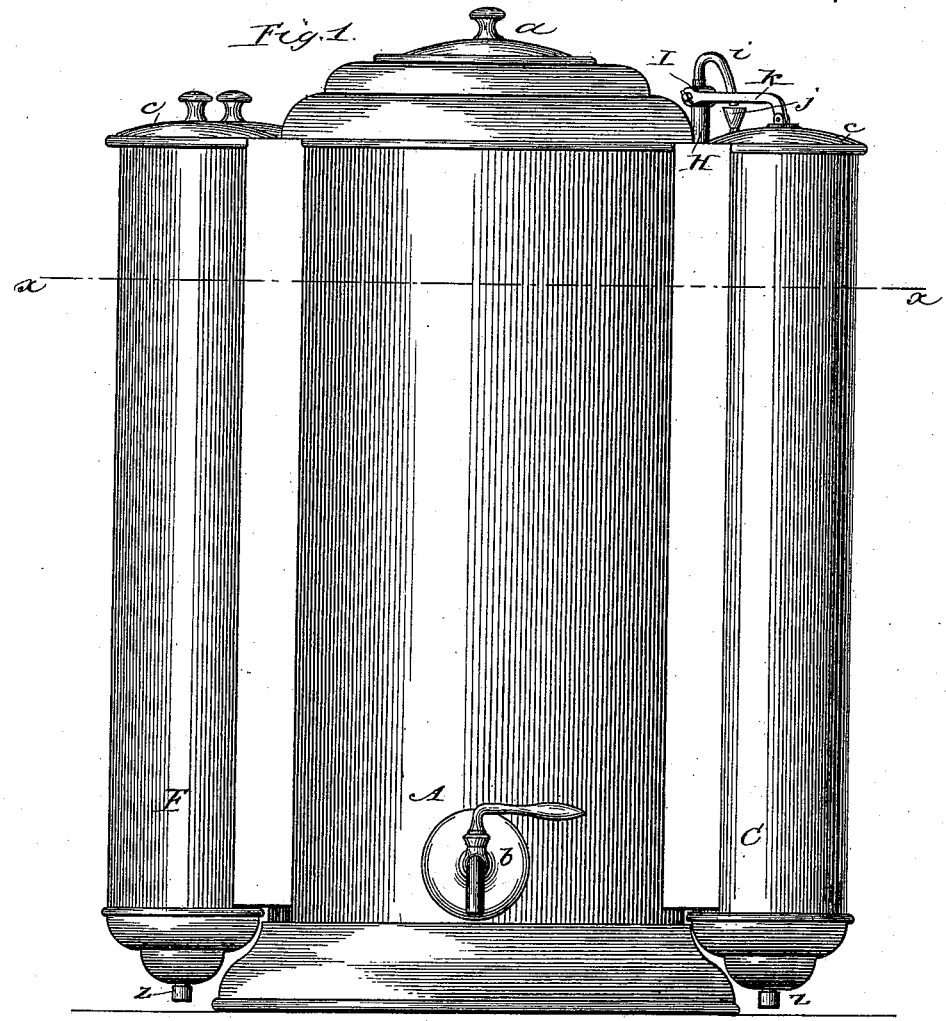
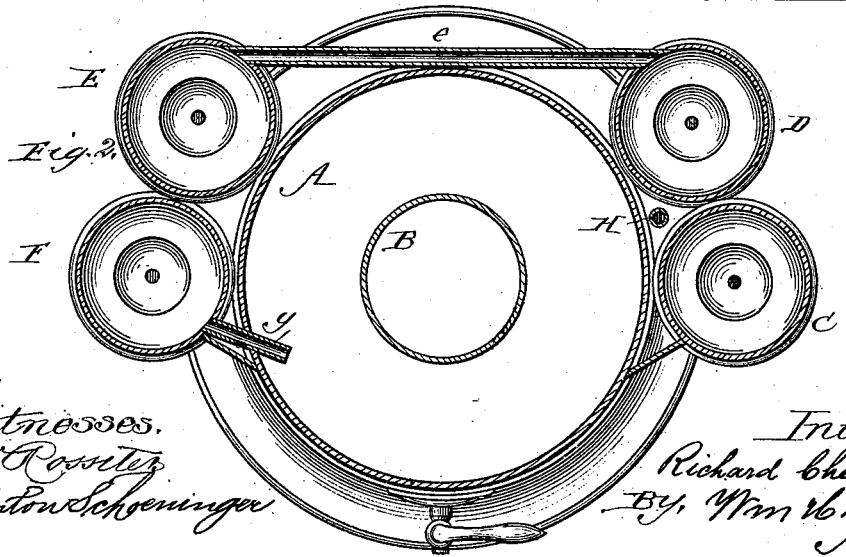
Witnesses.
W. C. Rossiter
Anton Schoeninger
Inventor:
Richard Chester
By, Wm H Lotz
Atty.

(No Model.) 2 Sheets—Sheet 2.
R. CHESTER.
WATER COOLER AND FILTER.
No. 354,687. Patented Dec. 21, 1886.
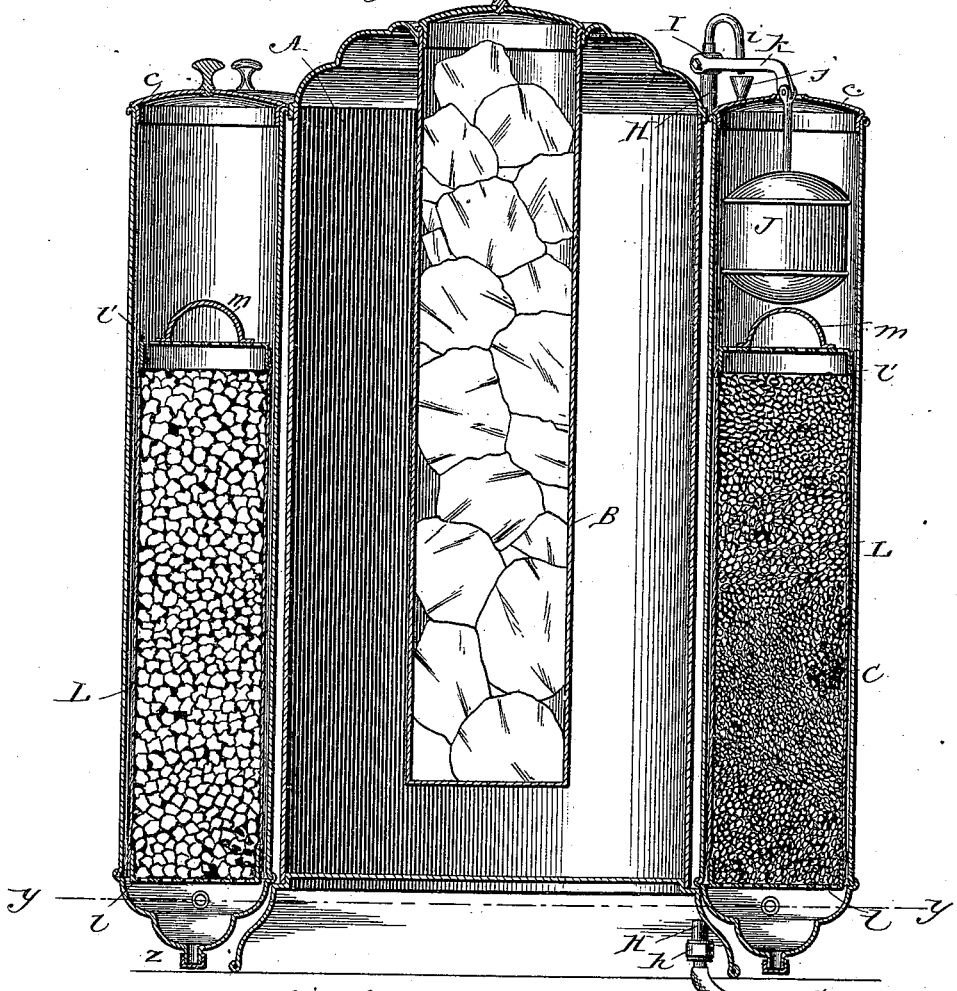
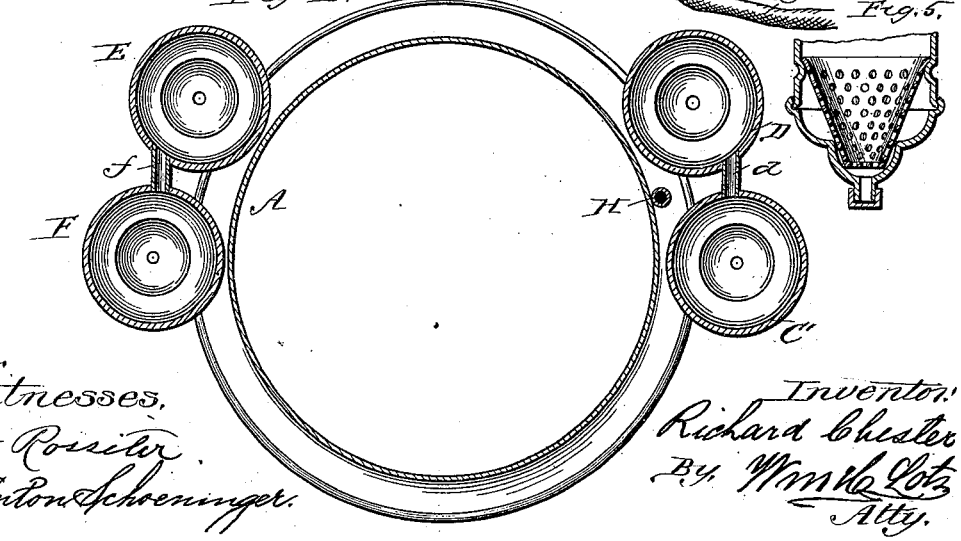
Witnesses.
W. Rossiter
Anton Schoeninger
Inventor:
Richard Chester
By Wm H Lotz
Atty.

UNITED STATES PATENT OFFICE.

RICHARD CHESTER, OF LAKE VIEW, ILLINOIS.

WATER COOLER AND FILTER.

SPECIFICATION forming part of Letters Patent No. 354,687, dated December 21, 1886.

Application filed April 6, 1886. Serial No. 198,018. (No model.)

*To all whom it may concern:*

Be it known that I, RICHARD CHESTER, a citizen of the United States of America, residing at Lake View, in the county of Cook and State of Illinois, have invented crtain new and useful Improvements in Water Coolers and Filters, of which the following is a specification, reference being had to the accompanying drawings.

This invention relates to water-coolers, and it has been my object to combine therewith a filtering attachment and an automatic water-feed, for the purpose of keeping such water-cooler constantly filled with pure and healthful water; and for that purpose my invention consists of the novel devices and combinations of devices hereinafter described, and specifically claimed.

In the accompanying drawings, Figure 1 represents a front elevation of the water-cooler having my improvements; Fig. 2, a sectional plan on line $x\,x$ in Fig. 1; Fig. 3, a longitudinal vertical section through the center of the water cooler and filter; Fig. 4, a sectional plan on line $y\,y$ in Fig. 3, and Fig. 5 a modificacation of the filtering-chambers.

Corresponding letters in the several figures of the drawings designate like parts.

A denotes the water cooler, vessel, or reservoir, it being of cylindrical shape, with a cover, $a$, and a faucet, $b$, and may be provided with an ice-holding vessel, B, pendent therein.

C, D, E, and F are the filtering-chambers, two of which being secured against each side of vessel A, and each provided with a cover, $c$, and at their bottom ends each with a screw-cap, Z. The vessels C and D communicate near their bases through a pipe, $d$, the vessels D and E communicate near their top through a pipe, $e$, and the vessels E and F again communicate near their bases through a pipe, $f$, while vessel F communicates with the water-cooler A near its top end through a pipe, $g$.

A pipe, H, is extended vertically through the space between vessels A, C, and D, having to its protruding bottom end a coupling-nut, $h$, for connecting it with a branch pipe, G, from the hydrant or other water-supply. To the top of this pipe H is connected a faucet, I, with a goose-neck spout, $i$, discharging into a funnel, $j$, of cover $c$ of the vessel D. The plug of faucet I has attached a crank, $k$, to the end of which is pivotally suspended the rod of a float, J, that, with being elevated, will turn the plug of faucet I for shutting off the water-supply. The pendent rod of float J is passed through a central opening in cover $c$.

The chambers C, D, E, and F are alternately filled with gravel and charcoal, through which the water will have to filter before entering the vessel A, and for ready removing and replacing the filtering material it is filled into cylinders L, made of canvas and secured with their ends over perforated metal cups $l\,l'$ by cords or wires tightened over such canvas, the top cup, $l'$, having a handle, $m$, by which to lift the canvas cylinder out of its chamber. These canvas-holders for the filtering material are not essential, however, since in place of them I can insert in the bottom of each chamber C D E F a conical strainer, $p$, made of perforated metal, as shown by Fig. 5, to be covered on its inside with filtering-cloth, when the filtering material can be filled direct into the chambers and can be removed through screw-caps Z. The chambers C and E thus being filled with gravel and the chambers D and F with charcoal, and the water being turned on it will rise through pipe H and discharge into chamber C through funnel $j$, where, with filtering through the gravel to the bottom, it will pass through pipe $d$ into chamber D, in which, with filtering through the charcoal, it will rise until reaching pipe $e$, through which the water will flow into chamber E, wherein it will filter downward again through the gravel, whence the water will flow through pipe $f$ into chamber F, to rise through the charcoal therein until reaching pipe $g$, and will then flow into reservoir A, and the water thus passing through the several chambers will be thoroughly cleansed and purified.

The chambers C and D must be nearly filled before any water can discharge into chambers E and F, which, again, must be nearly full before water can flow into vessel A, and after this is nearly filled the further supply of water will raise float J until shutting valve I, and proportionally as water is drawn from vessel A it will be automatically compensated from the water-supply to keep the several chambers filled to a uniform level.

For discharging slimy or solid matter that may settle to the bottom of chambers C, D, E, or F, the caps Z are unscrewed, and for washing or renewing the filtering material when packed into canvas bags, such bags can be removed, and by disconnecting one of the caps $l$ or $l'$ the material can be emptied therefrom, can be washed or exchanged for new material, and then the bags are closed again and replaced into the several chambers.

What I claim is—

1. The combination, with a water-cooler, of a series of chambers filled with filtering materials, and so connected that the water in its course will have to pass through all the chambers before entering the cooler-vessel, the same being constructed and arranged substantially as set forth, to operate as specified.

2. The combination, with a water-cooler, of a series of chambers filled alternately with gravel and charcoal and so connected with each other and with an automatic supply that the water in its course will have to alternately fall and rise through all the chambers in their successive order before entering the cooler-vessel, the same being constructed and arranged substantially as set forth, to operate as specified.

3. The combination, with a water-cooler, of a series of chambers communicating alternately at their top and bottom and then with the cooler-vessel and alternately filled with gravel and charcoal in a manner that the water in its course will have to filter through all such material in the several chambers before entering the cooler-vessel, the same being constructed and arranged substantially as set forth, to operate as specified.

4. The combination, with a water-cooler and with a series of filtering-chambers connected therewith and communicating with each other and with the cooler-vessel in a manner that the water in its course will have to fall and rise alternately through all the chambers in their successive order before entering such cooling-vessel, of a supply-faucet automatically regulated by a float, the whole being constructed and arranged substantially as set forth, to operate as specified.

5. The combination, with a water-cooler and with a series of chambers connected therewith and communicating with each other and with the cooler-vessel in a manner that the water in its course will have to fall and rise through all the chambers in their successive order before entering the cooler-vessel, of canvas bags secured with their ends upon perforated cups, and filled with gravel or charcoal alternately, and inserted removably into the several filtering-chambers, all substantially as set forth, for the purpose specified.

6. The combination, with a water-cooler, of a series of filtering-chambers connected therewith and communicating with each other and with the cooler-vessel, each such chamber being provided on its bottom with a screw-cap, substantially as and for the purpose set forth.

In testimony whereof I affix my signature in presence of two witnesses.

RICHARD CHESTER.

Witnesses:
ANTON SCHOENINGER,
HARRIS W. HUEHL.